United States Patent [19]
Ackermann et al.

[11] 3,929,841
[45] Dec. 30, 1975

[54] ISOLATION OF 1,5-DINITROANTHRAQUINONE

[75] Inventors: Otto Ackermann, Otterstadt; Heinz Eilingsfeld, Frankenthal, both of Germany

[73] Assignee: BASF Aktiengesellschaft, Ludwigshafen (Rhine), Germany

[22] Filed: July 2, 1974

[21] Appl. No.: 485,213

[30] Foreign Application Priority Data
July 7, 1973 Germany.............................. 2334713

[52] U.S. Cl.................................. 260/369; 260/380
[51] Int. Cl.²........................................... C09B 1/00
[58] Field of Search..................................... 260/369

[56] References Cited
UNITED STATES PATENTS

| | | |
|---|---|---|
| 2,309,708 | 2/1943 | Olpin ................................. 260/369 |
| 3,766,222 | 10/1973 | Hartwig et al. ...................... 260/369 |
| 3,786,073 | 1/1974 | Frey et al............................. 260/369 |
| 3,818,052 | 6/1974 | Hohmann ........................... 260/369 |
| 3,868,395 | 2/1975 | Bantel et al......................... 260/369 |

*Primary Examiner*—Arthur P. Demers
*Attorney, Agent, or Firm*—Johnston, Keil, Thompson & Shurtleff

[57] ABSTRACT

1,5-dinitroanthraquinone is isolated from a nitration mixture containing dinitroanthraquinones by allowing N-methylpyrrolidone to act on the nitroanthraquinone mixture. From 10 to 45% by weight of the nitroanthraquinone mixture remains undissolved and the undissolved material is separated from the solution. A dinitroanthraquinone is isolated which contains from 75 to 95% by weight of 1,5-dinitroanthraquinone and practically no β-dinitroanthraquinones.

6 Claims, No Drawings

ISOLATION OF 1,5-DINITROANTHRAQUINONE

The invention relates to a process for isolating 1,5-dinitroanthraquinone from mixtures of dinitroanthraquinones.

1,5-dinitroanthraquinone is a precursor for the production of blue disperse dyes based on 1,5-diamino-4,8-dihydroxyanthraquinone.

In the nitration of anthraquinone into dinitroanthraquinones mixtures are always obtained which contain about equal amounts of 1,5-dinitroanthraquinone, 1,8-dinitroanthraquinone and dinitroanthraquinones having β-nitro groups (such as 1,6-dinitro-, 1,7-dinitro- and 2,6-dinitroanthraquinones). For the production of dyes based on 1,5-diamino-4,8-dihydroxyanthraquinone it is necessary in many cases for tinctorial reasons to use as the starting compound pure 1,5-dinitroanthraquinone or at least a dinitroanthraquinone mixture which contains at least 75% by weight and advantageously more than 85% by weight of 1,5-dinitroanthraquinone and only very small amounts of β-dinitro compounds.

It is an object of the present invention to provide a process which it is easy to carry out industrially and by which a 1,5-dinitroanthraquinone suitable for the said purpose can be isolated from a technical dinitroanthraquinone mixture with minimum pollution of the environment.

We have found that 1,5-dinitroanthraquinone which is pure enough for the production of blue disperse dyes based on 1,5-diamino-4,8-dihydroxyanthraquinone can be obtained from technical dinitroanthraquinone mixtures by extraction by allowing N-methylpyrrolidone to act in such an amount on the dinitroanthraquinone mixture that from 10 to 45% by weight of the mixture remains undissolved.

The undissolved material separated consists to the extent of from 75 to 95% by weight and in most cases from 85 to 95% by weight of 1,5-dinitroanthraquinone and to the extent of from 25 to 5% by weight and in most cases from 15 to 5% by weight of 1,8-dinitroanthraquinone. The undissolved material contains very little or practically no β-dinitro compounds. These are only detectable if at all in traces in a thin layer chromatograph or by gas chromatography.

The proportion of the dinitroanthraquinone mixture which should remain undissolved by the treatment depends on the content of 1,5-dinitroanthraquinone in the dinitroanthraquinone mixture and is generally within the approximate range from once to half the content of 1,5-dinitroanthraquinone.

The process according to the invention is conveniently carried out by introducing the dinitroanthraquinone mixture into such an amount of N-methylpyrrolidone that from about 10 to 45% of the dinitroanthraquinone mixture used is not dissolved in the treatment.

The amount of N-methylpyrrolidone (hereinafter referred to as NMP) depends on the content of 1,5-dinitroanthraquinone in the dinitroanthraquinone mixture and especially on the temperature at which the treatment is to be carried out. The amount of NMP may be from half to 7 times the weight of the dinitroanthraquinone mixture.

As a rule the NMP is allowed to act at from room temperature to 150°C and preferably from 50° to 140°C, for example with stirring or agitation so that there is adequate mixing. The duration of the treatment is generally from half an hour to 2 to 3 hours depending on the temperature used. The undissolved material is then separated from the solution. It is important that the separation of the undissolved material from the liquid phase should take place at the temperature of treatment. This separation is carried out for example by decantation, filtration or preferably by centrifuging at the treatment temperature. The residue is freed from adherent NMP by washing with a solvent which is miscible with NMP such as methanol, acetone or isopropanol.

For example in the case of a dinitroanthraquinone mixture which contains 35% by weight of 1,5-dinitroanthraquinone 32% by weight of 1,8-dinitroanthraquinone and 33% by weight of 1,6-dinitroanthraquinone, 1,7-dinitroanthraquinone and 2,6-dinitroanthraquinone together 5 times the weight of NMP may be used at 60°C. After 1 hour the residue is separated from the solution at 60°C. The residue contains from 90 to 95% by weight of 1,5-dinitroanthraquinone, the remainder being 1,8-dinitroanthraquinone. β-dinitroanthraquinones are detectable only in traces if at all.

The solvent may be recovered by distillation from the filtrate which contains mainly the β-dinitroanthraquinones and 1,8-dinitroanthraquinone with a little 1,5-dinitroanthraquinone. The dissolved dinitroanthraquinones may be precipitated from the distillation residue for example by introduction into water and isolated. The recovered NMP may be used again for further purification operations.

The dinitroanthraquinone mixture is conveniently used in the form of dry powder. The moist pressed material obtained in the isolation of the nitroanthraquinone mixture may however be used if the adherent water is previously removed by washing with a solvent such as methanol, isopropanol or acetone. The dinitroanthraquinone mixture wet with solvent is then introduced into NMP and the low boiling point solvent is distilled off during the treatment.

The purification process may be carried out continuously or batchwise.

The result of the process according to the invention is surprising because on account of the very similar physical properties of the 1,5-, 1,8-, 1,6-, 1,7- and 2,6-dinitroanthraquinones formed in the dinitration of anthraquinone it was not to be expected that a concentration of the 1,5-dinitroanthraquinone in the undissolved material would take place by a simple extraction with NMP. The process according to the invention requires much less solvent than fractionation from sulfuric acid and the solvent can be recovered in a simple manner. Because of the low solubility of dinitroanthraquinones in concentrated sulfuric acid the extraction has to be carried out with 20% by weight oleum (Belgian Patent No. 788,016).

The following Examples will further illustrate the process. The parts and percentages are by weight.

EXAMPLE 1

250 parts of a dinitroanthraquinone mixture (consisting of about 35% by weight of 1,5-dinitroanthraquinone, 32% by weight of 1,8-dinitroanthraquinone and about 33% by weight of 1,6-, 1,7- and 2,6-dinitroanthraquinone) is stirred for 1 hour with 1250 parts of NMP at 60°C, suction filtered at 60°C, washed with 100 parts of methanol (isopropyl alcohol or acetone) and dried. 82 parts of 1,5-dinitroanthraquinone is obtained with a purity of 92.3%. The remainder is 1,8-dinitroanthraquinone.

EXAMPLES 2 to 15

50 parts of a dinitroanthraquinone mixture of the composition given in the Table is stirred with A parts of NMP at t°C for 1 hour and the undissolved material is suction filtered from the solution at this temperature on a heated filter. The residue is washed with 20 parts of methanol, isopropanol or acetone and dried. The yield is X parts of 1,5-dinitroanthraquinone of the composition given in the Table. Other abbreviations used in the Table are:

Ex = Example

DNAM = percentage of 1,5-dinitroanthraquinone and 1,8-dinitroanthraquinone in the dinitroanthraquinone mixture, the remainder being 1,6-, 1,7- and 2,6-dinitroanthraquinone.

Residue = percentage of 1,5-dinitroanthraquinone and 1,8-dinitroanthraquinone, the remainder being 1,6-, 1,7- and 2,6-dinitroanthraquinone.

Table

| Ex | DNAM 1,5- | DNAM 1,8- | NMP A | t°C | X | Residue 1,5- | Residue 1,8- |
|---|---|---|---|---|---|---|---|
| 2 | 49 | 39 | 50 | 140 | 22.5 | 85 | 14 |
| 3 | 49 | 39 | 150 | 60 | 24.5 | 82 | 17 |
| 4 | 49 | 39 | 150 | 100 | 18.5 | 97 | 2 |
| 5 | 49 | 39 | 150 | 140 | 15 | 99 | 0.5 |
| 6 | 49 | 39 | 250 | 60 | 19 | 97 | 2 |
| 7 | 49 | 39 | 250 | 100 | 16 | 99 | 0.5 |
| 8 | 49 | 39 | 250 | 140 | 8.5 | 99 | 0.5 |
| 9 | 35 | 32 | 50 | 140 | 16 | 93 | 6 |
| 10 | 35 | 32 | 150 | 60 | 19 | 90 | 9 |
| 11 | 35 | 32 | 150 | 100 | 13 | 98 | 1 |
| 12 | 35 | 32 | 150 | 140 | 10 | 99 | <0.5 |
| 13 | 35 | 32 | 250 | 60 | 15 | 97 | 2 |
| 14 | 35 | 32 | 250 | 100 | 12 | 99 | 0.5 |
| 15 | 35 | 32 | 250 | 140 | 5 | 99 | <0.5 |

We claim:

1. A process for the isolation of 1,5-dinitroanthraquinone by extraction from a dinitroanthraquinone mixture which has been obtained by dinitration of anthraquinone wherein such an amount of N-methylpyrrolidone is allowed to act on the dinitroanthraquinone mixture that from 10 to 45% by weight of the mixture remains undissolved.

2. A process as claimed in claim 1 wherein the treatment is carried out at a temperature of from room temperature to 150°C.

3. A process as claimed in claim 1 wherein the treatment is carried out at a temperature of from 50° to 140°C.

4. A process as claimed in claim 1 wherein the treatment is carried out with an amount of N-methylpyrrolidone which is from 0.5 to 7 times the amount of the dinitroanthraquinone mixture.

5. A process as claimed in claim 2 wherein the amount of N-methylpyrrolidone used for the treatment is from 0.5 to 7 times the amount of dinitroanthraquinone mixture.

6. A process as claimed in claim 3 wherein the amount of N-methypyrrolidone used for the treatment is from 0.5 to 7 times the amount of the dinitroanthraquinone mixture.

* * * * *